Patented Sept. 8, 1925.

1,552,973

UNITED STATES PATENT OFFICE.

SAMUEL F. WALTON, OF CAMBRIDGE, MASSACHUSETTS, ASSIGNOR TO KALMUS, COMSTOCK & WESCOTT, INC., OF BOSTON, MASSACHUSETTS, A CORPORATION OF MASSACHUSETTS.

PIGMENT AND PROCESS FOR MAKING THE SAME.

No Drawing.   Application filed May 5, 1922.   Serial No. 558,749.

*To all whom it may concern:*

Be it known that I, SAMUEL F. WALTON, a citizen of the United States, residing at Cambridge, in the county of Middlesex and State of Massachusetts, have invented certain new and useful Improvements in Pigments and Processes for Making the Same; and I do hereby declare the following to be a full, clear, and exact description of the invention, such as will enable others skilled in the art to which it appertains to make and use the same.

This invention relates to a carbon pigment of the lampblack type and to a process for producing it from the black ash residue of the soda process of wood pulp manufacture.

At the present time, in the soda process of wood pulp manufacture, the lignin and sap, etc. are dissolved out of the timber by caustic soda leaving the cellulose fibre as pulp. In order to recover the caustic soda in the form of sodium carbonate, the usual practice is to concentrate the caustic soda solution with the woody material dissolved in it, to a syrupy consistency forming a material known as black liquor. This black liquor is then incinerated forming a solid material known as black ash. After inceneration the black ash is quenched with water and leached for the recovery of the sodium carbonate. Numerous efforts have been made to utilize this black ash for the preparation of a carbon pigment but none of these efforts have, so far as I am aware, been successful. The products produced by these prior attempts have had low tinctorial value, a relatively low carbon content as compared to lampblack and the material has always contained much grit, rendering it unsuitable as a high grade pigment. Furthermore, a serious fire and explosion risk has attended the grinding and drying operations of such prior processes.

In accordance with the present invention, the black ash is subjected to treatment to form a high grade carbon pigment containing less than 1% ash, mixing well with oil and dispersing excellently in organic solvents, and which is darker than the usual standard lampblack both when "painted out" with linseed oil with full strength and when similarly "painted out" in a "bleach" of 100:1 with zinc oxide and linseed oil. The present product has a markedly lower oil absorption value than the standard lampblack, approximating two thirds of the absorption value of the latter, and while quite as fine as the standard lampblack, it is less bulky, one pound requiring approximately one half the space required for a pound of ordinary standard lampblack. The novel and improved method of producing the improved carbon pigment is economical in operation, entirely free from fire risk and may be practiced in connection with the ordinary soda process of wood pulp manufacture without interference with either the equipment or operation of the latter plant.

The invention, therefore, consists in the product and process hereinafter described and particularly defined in the claims.

The specific process by which the present improved carbon pigment is preferably made is described as follows: The sludge of black ash as discharged from the soda leaching system of the pulp plant, is pumped preferably by a centrifugal pump to a storage tank located at a convenient distance from the pulp plant and in which the black ash is permitted to settle. The solid material or settled black ash is then ground while wet, being delivered from the storage tank by a worm feed or otherwise, as may be desired, to a disc grinder of any usual or preferred construction, so operated as to reduce the size of the black ash particles to an average of from 60 to 70 mesh. By grinding the settled black ash while wet, the danger of explosion and the incident fire risk is eliminated.

In order to produce a pigment of desirable characteristics and quality, provision is made for removing the lighter portions of the ground black ash and also for removing the heavier or gritty portions. This is most conveniently accomplished by conducting the ground material into tanks fitted for air agitation. These tanks will preferably be of the Parral type, well-known in cyanide milling operations, and after the ground material has been received in the tanks, water is added in the proportion of approximately ten pounds to one pound of the black ash material. The slurry within the Parral tanks is then agitated with air for a period of about four hours, depending upon the character of the particular black ash and upon minor operating conditions. During the air agitation, a scum continuously forms upon the surface of the slurry, and I have found that continuing the air agitation and removing or skimming off the scum, as it forms, operates to greatly improve the color and other desirable and valuable properties of the pigment remaining in suspension. To assist in the skimming operation, air jets may be arranged at or near the center of the tank to blow fanwise radially along the surface of the liquid to thereby urge the floating material to the outer edges of the tank, whence it is removed, either with skimming ladles or by permitting it to overflow into an annular launder surrounding the tank. As stated, this air agitation and skimming operation is continued until the amount of material rising to the surface becomes negligible and the surface of the liquid or slurry in the tank which, during the early part of the operation was silvery gray, becomes much blacker and shows little or no floating material.

After the lighter objectionable constituents of the black ash have been removed, in the foregoing manner, the slurry within the tank is allowed to stand quietly for a short period of time, varying from five to thirty minutes, depending upon the dimensions of the tank and the original cleanliness of the black ash, that is to say upon its freedom from foreign gritty substances. During this period of time the heavier and gritty portions of the suspended material settle at the bottom of the tank. The slurry above the settled material is then decanted off into a shallow settling tank provided with leaf filters. In practice I have found that four-fifths of the contents of the tank may be thus decanted safely. The tank is then refilled with water, agitated for a short period of time in the neighborhood of five minutes, the slurry permitted to settle for the same period of time as before, and then decanted into the shallow settling tank, leaving a residue in the tank unfitted for pigment use and containing the heavier and gritty portions of the original black ash. This residue may be thrown away or recovered for fuel, together with the floating portions, if so desired.

The foregoing procedure serves to separate the objectionable lighter and heavier constituents of the original black ash and leaves the pigment-forming material in suspension in the shallow settling tank. The pigment-forming material is then permitted to settle in the shallow settling tank for a number of hours, usually over night, after which the supernatant water is decanted off and used again if desired in the Parral tanks, or discarded. During the early stages of the settling process in the shallow settling tank a set of leaf filters is preferably dropped into the tank and after decantation suction may be applied to these filters to thicken and remove a major portion of the water from the settled material. The material is removed from the bottom of the tank, preferably stored in an elevated storage tank fitted with a hopper bottom and a screw conveyer arranged to feed into and deliver the material continuously to a tube mill of usual construction fitted with steel liners and steel balls, in which the material is ground to the desired degree of fineness comparable to the standard grade of lampblack on the market.

The ground material discharged from the tube mill is preferably further treated for additional purification, and for this purpose the discharge from the tube mill is pumped into a steam agitated wooden tank to which water is added to produce a slurry having a proportion of one pound of carbon or solid material to four pounds of water and thereafter muriatic acid, preferably to the extent of 10% of the dry weight of the carbon, is added to the tank. The slurry is then agitated with steam until the temperature is raised to 85 or 90 degrees C. and for a period of thirty minutes thereafter. The quantity of muriatic acid employed may be varied in accordance with the cleanliness of the original black ash. In any case the quantity of acid used will preferably be about 10% in excess of the amount theoretically indicated by the usual laboratory analysis to accomplish the removal of hydrochloric acid soluble substances. After the acid treatment for a period of thirty minutes the slurry is then washed to eliminate the excess acid, and for this purpose the slurry is run into a larger tank and diluted with water to four times its bulk, agitated with steam and the faintly acid solution filtered on a continuous filter without washing at a temperature of 50 to 60 degrees C. The cake upon the filter is dumped into a second wash tank where it is agitated with fresh clean water in the proportion of approximately 16 pounds of water to 1 pound of cake. After thorough agitation the slurry is then filtered and the cake dried in steam heated shelf dryers of any usual or preferred construction. During the drying the cake shrinks considerably exposing increased surfaces and drying very rapidly and safely. In the shelf drying operation no dusting occurs so there is no explosion risk as would be the case were the material to be treated in a rotary dryer.

In order to prepare the dried cake for the trade in the form in which the trade is accustomed to receive lampblack the friable lump product of the shelf dryer is further disintegrated and pulverized. This operation may be carried out in any of the known types of disintegrators and which are during the operation enclosed in a relatively air tight chamber. The disintegrators preferably feed directly into storage chambers fitted with hoppers and standard packaging devices. The air space above the pigment in the storage chambers, and the air space in the disintegrators and around them, is necessarily full of carbon dust, and to eliminate fire and explosion risk I keep these spaces filled with flue gas, if available, or with air in which the oxygen has largely been converted to oxides of carbon by passing through suitable stoves, as is usual where it is desired to produce an atmosphere substantially free from oxygen. By conducting the disintegration and storage in an atmosphere substantially free from oxygen the fire and explosion risk is avoided.

The foregoing process will preferably be employed to produce a pigment in a form comparable with and superior to the standard lampblacks on the market. It is to be understood that for some purposes the wet cake, either before or after acid treatment, is directly salable, and that for still other purposes the soft and friable lump product of the shelf dryer is satisfactory.

The words "black ash" as used herein are intended to define the carbonaceous product resulting from the incineration of the black liquor of the soda process, and while the invention has been described as applied to a process for the production of the improved pigment from black ash, it will be understood that the pigment may be made from other impure carbonaceous material within the scope of the following claims.

I claim:

1. A process for the manufacture of a carbon pigment from the black ash residue of the soda process of wood pulp manufacture which consists in treating the black ash to remove the lighter and heavier portions therefrom and thereafter grinding the residue to form the pigment.

2. The steps in the manufacture of a carbon pigment from the black ash residue of the soda process of wood pulp manufacture which consist in grinding the black ash and thereafter removing the lighter impure portions therefrom.

3. A process for the manufacture of a carbon pigment from the black ash residue of the soda process of wood pulp manufacture which consists in treating the black ash to remove the lighter and heavier portions therefrom, grinding the residue and thereafter treating it with acid to remove acid soluble substances.

4. The steps in the manufacture of a carbon pigment from the black ash residue of the soda process of wood pulp manufacture which consists in treating the black ash to remove the lighter portions therefrom, and agitating the residue with dilute acid.

5. A process for the manufacture of a carbon pigment from the black ash residue of the soda process of wood pulp manufacture which consists in crushing the black ash, agitating it in water suspension to float off the lighter portions, settling out the heavier portions and separating the intermediate portion from the lighter and heavier portions and producing the pigment therefrom.

6. A process for the manufacture of a carbon pigment from the black ash residue of the soda process of wood pulp manufacture which consists in crushing the black ash, agitating it in water suspension to float off the lighter portions, settling out the heavier portions, and subjecting the material contained in the intermediate portion to grinding and agitating with dilute acid.

7. A process for the manufacture of a carbon pigment from the black ash residue of the soda process of wood pulp manufacture which consists in crushing the black ash, agitating it with water, floating off and removing the lighter portions, permitting the heavier portions to settle, separating the slurry from the heavier portions, settling the solid material from the slurry and thereafter grinding it while wet.

8. A process for the manufacture of a carbon pigment from the black ash residue of the soda process of wood pulp manufacture which consists in crushing the black ash, agitating it with water, floating off the lighter portions which rise to the surface of the water, permitting the heavier portions to settle, separating the slurry from the heavier portions, settling the solid material from the slurry, grinding it while wet, suspending the ground material in dilute hydrochloric acid and thereafter recovering the pigment from the suspension.

9. A process for the manufacture of a carbon pigment from the black ash residue of the soda process of wood pulp manufacture which consists in treating the black ash to remove the lighter portions therefrom, grinding the residue while wet, and drying the ground material.

10. A process for the manufacture of a carbon pigment from the black ash residue of the soda process of wood pulp manufacture which consists in treating the black ash to remove the lighter and heavier portions therefrom, grinding the residue while wet and drying the ground material.

11. A process for the manufacture of a carbon pigment from the black ash residue of the soda process of wood pulp manufacture which consists in treating the black ash to remove the lighter and heavier portions therefrom, grinding the residue while wet, drying the ground material, and disintegrating the dried material in an atmosphere substantially free from oxygen.

12. A process for the manufacture of a carbon pigment which consists in subjecting an impure carbonaceous material to treatment to remove the lighter and heavier portions therefrom and recovering the pigment from the intermediate portion.

13. A process for the manufacture of a carbon pigment which consists in subjecting an impure carbonaceous material to treatment to remove the lighter and heavier portions therefrom, and agitating the intermediate portion with dilute acid.

14. The step in the manufacture of a carbon pigment from an impure carbonaceous material which consists in floating off the lighter and readily floatable impure portions therefrom.

15. The step in the manufacture of a carbon pigment from black ash which consists in agitating the ash in liquid and floating off the impure portions which rise to the surface.

SAMUEL F. WALTON.